(12) United States Patent
Spillane et al.

(10) Patent No.: US 12,726,127 B2
(45) Date of Patent: Sep. 1, 2026

(54) MONITORING TEMPERATURE PER PHASE IN A MULTIPHASE POWER STAGE

(71) Applicant: SEMICONDUCTOR COMPONENTS INDUSTRIES, LLC, Scottsdale, AZ (US)

(72) Inventors: Margaret Spillane, Limerick (IE); Kevin Kelliher, Coolflugh (IE); Owen Cregg, Clarinbridge (IE); Paul J. Harriman, Indian Harbour, FL (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 141 days.

(21) Appl. No.: 18/913,004

(22) Filed: Oct. 11, 2024

(65) Prior Publication Data

US 2025/0038668 A1 Jan. 30, 2025

Related U.S. Application Data

(63) Continuation of application No. 17/815,984, filed on Jul. 29, 2022, now Pat. No. 12,143,019.

(51) Int. Cl.
*H02M 3/158* (2006.01)
*H02M 1/32* (2007.01)

(52) U.S. Cl.
CPC ......... *H02M 3/1584* (2013.01); *H02M 1/327* (2021.05)

(58) Field of Classification Search
CPC .... H02M 3/1582; H02M 3/155; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875;

(Continued)

(56) References Cited

U.S. PATENT DOCUMENTS

| | | | |
|---|---|---|---|
| 12,348,143 B2 * | 7/2025 | Grisamore | G06F 1/28 |
| 2021/0124696 A1 * | 4/2021 | Aichriedler | G06F 7/588 |
| 2022/0300019 A1 * | 9/2022 | Lawange | H03M 1/508 |

* cited by examiner

*Primary Examiner* — Jeffrey A Gblende
(74) *Attorney, Agent, or Firm* — Brake Hughes Bellermann LLP

(57) ABSTRACT

A multiphase power stage that includes addressing and communication techniques to read temperatures of the phases for thermal load balancing is disclosed. The disclosure describes driver modules that can be assigned addresses for serial communication on a common communication bus by temporarily communicating the addresses over dedicated pulse width modulation connections between the driver modules and the controller. After assignment, a temperature request message, addressed to a driver module, can trigger the driver module to transmit an analog temperature signal to a common temperature bus coupled between the driver modules and the controller. The temperatures of the driver modules may be collected in order to activate and deactivate driver modules based on their temperatures, which can balance a thermal load on the multiphase power stage.

20 Claims, 9 Drawing Sheets

(58) Field of Classification Search
CPC .... H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38
See application file for complete search history.

MONITORING TEMPERATURE PER PHASE IN A MULTIPHASE POWER STAGE

CROSS-REFERENCE TO RELATED APPLICATION

This application claims priority to and is a continuation of U.S. patent application Ser. No. 17/815,984 filed on Jul. 29, 2022, which is hereby incorporated by reference in its entirety.

FIELD OF THE DISCLOSURE

The present disclosure relates to power electronics and more specifically to controlling temperature of voltage regulation modules in a multiphase power stage enabled by communication between a controller and driver modules in a multiphase power stage.

BACKGROUND

A load may be coupled to a rail for power. The power drawn by a load (e.g., a processor) may change over time as its operating requirements change. Distributing the power delivery requirements over multiple phases may correspond to higher efficiency and better thermal performance for each phase. Each phase may receive pulse width modulation (PWM) signals from a control module to supply a voltage and a current to a rail. The PWM signal at each phase may be adjusted to distribute the power delivery requirements.

SUMMARY

In some aspects, the techniques described herein relate to a multiphase power stage including: a communication bus configured for serial communication of digital messages; a temperature bus configured for transmission of analog signals; a driver module coupled to the communication bus and coupled to the temperature bus; and a controller coupled to the communication bus and coupled to the temperature bus, the controller configured by instructions to: select an address assigned to the driver module from a list of addresses; transmit a temperature request message addressed to the driver module to the communication bus; receive a temperature signal from the temperature bus during a timeslot; the temperature signal transmitted to the temperature bus during the timeslot by the driver module in response to the temperature request message addressed to the driver module; and obtain a phase temperature for the driver module based on the temperature signal and the timeslot during which the temperature signal was received.

In some aspects, the techniques described herein relate to a multiphase power stage, wherein the address is a first address, the driver module is a first driver module, the timeslot is a first timeslot, the phase temperature is a first phase temperature, and the controller is further configured by instructions to: select a second address assigned to a second driver module from the list of addresses; transmit a temperature request message addressed to the second driver module to the communication bus; receive the temperature signal from the temperature bus during a second timeslot; the temperature signal transmitted to the temperature bus during the second timeslot by the second driver module in response to the temperature request message addressed to the second driver module; and obtain a second phase temperature for the second driver module based on the temperature signal and the second timeslot during which the temperature signal was received.

In some aspects, the techniques described herein relate to a multiphase power stage, wherein the controller is further configured to record the first phase temperature and the second phase temperature in a database.

In some aspects, the techniques described herein relate to a multiphase power stage, wherein the list of addresses corresponds to driver modules of a first rail of the multiphase power stage, the controller configured to obtain phase temperatures of driver modules of a first rail based on the list of addresses.

In some aspects, the techniques described herein relate to a multiphase power stage, wherein the list of addresses is a first list of addresses, the controller further configured by instructions to: select a second list of addresses corresponding to driver modules of a second rail of the multiphase power stage; and obtain phase temperatures of driver modules of the second rail based on the second list of addresses.

In some aspects, the techniques described herein relate to a multiphase power stage, wherein the controller is further configured to: obtain phase temperatures of driver modules of the multiphase power stage at a first reading based on the list of addresses; identify a coldest driver module based on the phase temperatures at the first reading; identify a hottest driver module based on the phase temperatures at the first reading; transmit a first message addressed to the coldest driver module over the communication bus, the first message activating the coldest driver module; and transmit a second message addressed to the hottest driver module over the communication bus, the second message deactivating the hottest driver module.

In some aspects, the techniques described herein relate to a multiphase power stage, wherein the controller is further configured to: wait a period; obtain, after the period, phase temperatures of driver modules of the multiphase power stage at a second reading based on the list of addresses; identify a coldest driver module of the second reading based on the phase temperatures at the second reading; identify a hottest driver module of the second reading based on the phase temperatures at the second reading; transmit a first message addressed to the coldest driver module of the second reading over the communication bus, the first message activating the coldest driver module of the second reading; and transmit a second message addressed to the hottest driver module of the second reading over the communication bus, the second message deactivating the hottest driver module of the second reading.

In some aspects, the techniques described herein relate to a multiphase power stage, wherein the period is proportional to a thermal coefficient corresponding to at least one of the driver modules of the multiphase power stage.

In some aspects, the techniques described herein relate to a multiphase power stage, wherein the controller is configured to: obtain phase temperatures of driver modules of the multiphase power stage based on the list of addresses; receive a load condition of the multiphase power stage; determine, based on the load condition, that a phase count should be decreased; and deactivate a hottest phase of the driver modules based on the phase temperatures.

In some aspects, the techniques described herein relate to a multiphase power stage, wherein the controller is configured to: obtain phase temperatures of driver modules of the multiphase power stage based on the list of addresses; receive a second load condition of the multiphase power stage; determine, based on the second load condition, that a phase count should be increased; and activate a coldest phase of driver modules based on the phase temperatures.

In some aspects, the techniques described herein relate to a method for obtaining phase temperatures in a multiphase power stage, the method including: selecting an address assigned to a driver module from a list of addresses; transmitting, a temperature request message addressed to the driver module over a communication bus configured for serial communication of digital messages; receiving, during a timeslot, a temperature signal from a temperature bus configured for transmission of analog signals, the temperature signal transmitted to the temperature bus during the timeslot by the driver module in response to the temperature request message; and obtaining a phase temperature for the driver module based on the temperature signal and the timeslot during which the temperature signal was received.

In some aspects, the techniques described herein relate to a method, where the address is a first address, the driver module is a first driver module, the timeslot is a first time slot, the phase temperature is a first phase temperature, the method further including: selecting a second address assigned to a second driver module from the list of addresses; transmitting a temperature request message addressed to the second driver module over the communication bus; receiving, during a second timeslot, the temperature signal from the temperature bus, the temperature signal during the second timeslot transmitted to the temperature bus by the second driver module in response to the temperature request message addressed to the second driver module; and obtaining a second phase temperature for the second driver module based on the temperature signal and the second timeslot during with the temperature signal was received.

In some aspects, the techniques described herein relate to a method, further including: recording the first phase temperature and the second phase temperature in a database.

In some aspects, the techniques described herein relate to a method, further including: obtaining phase temperatures of driver modules of a first rail based on the list of addresses.

In some aspects, the techniques described herein relate to a method, wherein the list of addresses is a first list of addresses, the method further including: selecting a second list of addresses corresponding to driver modules of a second rail of the multiphase power stage; and obtaining phase temperatures of driver modules of the second rail based on the second list of addresses.

In some aspects, the techniques described herein relate to a method, further including: obtaining phase temperatures of driver modules of the multiphase power stage at a first reading based on the list of addresses; identifying a coldest driver module based on the phase temperatures at the first reading; identifying a hottest driver module based on the phase temperatures at the first reading; transmitting a first message addressed to the coldest driver module over the communication bus, the first message activating the coldest driver module; and transmitting a second message addressed to the hottest driver module over the communication bus, the second message deactivating the hottest driver module.

In some aspects, the techniques described herein relate to a method, further including: waiting a period; obtaining, after the period, phase temperatures of driver modules of the multiphase power stage at a second reading based on the list of addresses; identifying a coldest driver module of the second reading based on the phase temperatures at the second reading; identifying a hottest driver module of the second reading based on the phase temperatures at the second reading; transmitting a first message address to the coldest driver module of the second reading over the communication bus, the first message activating the coldest driver module of the second reading; and transmitting a second message addressed to the hottest driver module of the second reading over the communication bus, the second message deactivating the hottest driver module of the second reading.

In some aspects, the techniques described herein relate to a method, wherein the period is proportional to a thermal coefficient corresponding to at least one of the driver modules of the multiphase power stage.

In some aspects, the techniques described herein relate to a method, further including: obtaining phase temperatures of driver modules of the multiphase power stage based on the list of addresses; receiving a load condition of the multiphase power stage; determining, based on the load condition, that a phase count should be decreased; and deactivating a hottest phase of the driver modules based on the phase temperatures.

In some aspects, the techniques described herein relate to a method, further including: obtaining phase temperatures of driver modules of the multiphase power stage based on the list of addresses; receiving a second load condition of the multiphase power stage; determining, based on the second load condition that a phase count should be increased; and activating a coldest phase of the driver modules based on the phase temperatures.

In some aspects, the techniques described herein relate to a controller for a multiphase power supply the controller configured by instructions to: select an address assigned to a driver module from a list of addresses; transmit, a temperature request message addressed to the driver module over a communication bus configured for serial communication of digital messages; receive, during a timeslot, a temperature signal from a temperature bus configured for transmission of analog signals, the temperature signal transmitted to the temperature bus during the timeslot by the driver module in response to the temperature request message; and obtain a phase temperature for the driver module based on the temperature signal and the timeslot during which the temperature signal was received.

In some aspects, the techniques described herein relate to a controller, wherein the address is a first address, the driver module is a first driver module, the timeslot is a first timeslot, the phase temperature is a first phase temperature, and the controller is further configured by instructions to: select a second address assigned to a second driver module from the list of addresses; transmit a temperature request message addressed to the second driver module to the communication bus; receive the temperature signal from the temperature bus during a second timeslot; the temperature signal transmitted to the temperature bus during the second timeslot by the second driver module in response to the temperature request message addressed to the second driver module; and obtain a second phase temperature for the second driver module based on the temperature signal and the second timeslot during which the temperature signal was received.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
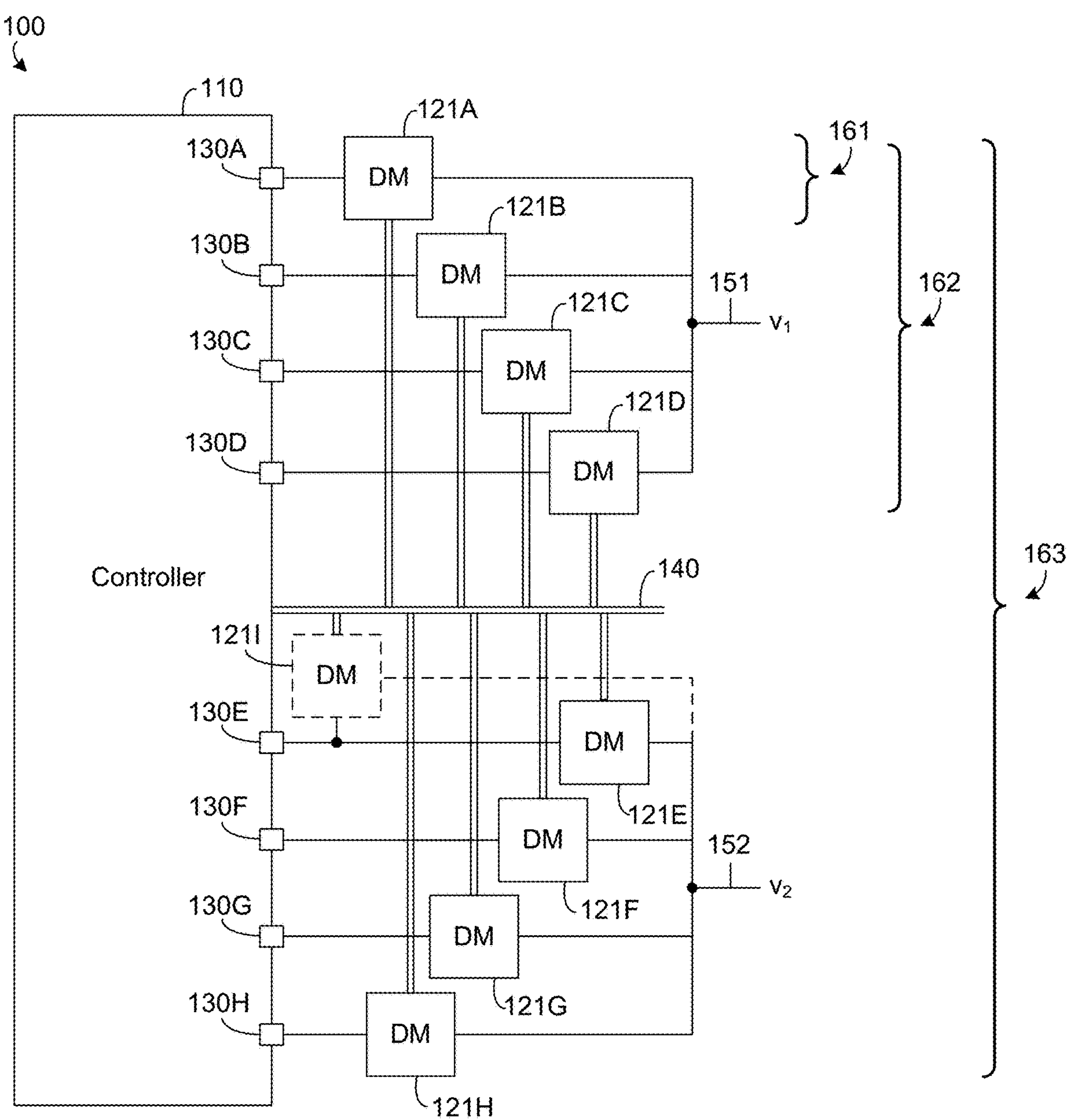
FIG. 1 is a block diagram of a multiphase power stage according to a possible implementation of the present disclosure.

A power stage may include multiple phases to output a regulated voltage at a current level to a rail. The phase voltage of each phase at the rail is the rail voltage and the phase currents from each phase may sum at the rail as the rail current supplied to the load. The rail current may vary over time as a load condition of a load coupled to the rail changes. As a result, the multiple phases coupled to the rail can be driven differently to adjust the current supplied to the load.

Each phase may receive a pulse width modulation (PWM) signal from a controller. A PWM signal for one phase may be the same or different from the other phases and configure the phases to supply the appropriate phase current for the load. As a result, the phases may supply different phase currents to the rail at different times as the needs of the load change (i.e., according to a load condition). For example, in a light load condition, a phase may be deactivated temporarily when the necessary rail current can be supplied without it. In a heavy load condition, all phases may be activated to supply the rail current.

PWM signals for the phases may change based on load condition. As a result, the phases in a multiphase power stage may operate at different temperatures. For example, in a particular load condition, one phase can operate at a significantly higher temperature than the other phases when it receives a PWM signal with a higher duty cycle than the other phases. As this load condition continues, this phase (i.e., the hot phase) can reach a maximum operating temperature and trigger a thermal shutdown of the power stage. The thermal shutdown may be premature because phases, other than the hot phase, may be at an operating temperature within a range corresponding to normal operation (i.e., at a normal temperature).

Shifting the power requirements from the hot phase to a phase at a lower temperature (i.e., a cool phase), can allow the hot phase to cool before reaching the maximum operating temperature, thereby delaying or preventing the thermal shutdown. When the temperature is more evenly distributed, the power stage may be able to operate in the heavy load condition longer before reaching a temperature that triggers a thermal shutdown. What is more, the even distribution may result in fewer thermal shutdowns because the load condition (e.g., heavy load condition) causing the heating may be able to reach its conclusion and transition to a cooler load condition before a thermal shutdown is triggered.

The redistribution of power delivery between phases effectively requires monitoring the temperatures of the phases (i.e., temperature monitoring). Existing temperature monitoring approaches may be limited, however, because of some technical problems.

One technical problem with existing monitoring approaches is that it may be unclear which phase (of the multiple phases for a rail) is the hot phase. In other words, it may be unclear which phase needs a lower load and which phase can accept a higher load. For example, a multiphase power stage may include one negative temperature coefficient thermistor (i.e., NTC) to generate a temperature measurement representative of all phases. The temperature measured by the NTC may accurately represent the temperature for the closest phase, but the accuracy of this temperature measurement decreases with distance. Accordingly, the practicality of the single NTC approach may decrease as the number of phases increase. As a result, some existing monitoring approaches measure a temperature at each phase.

Another technical problem with the existing monitoring approaches is that the communication between the controller and the phases may be limited. For example, size requirements of a power stage for an application (e.g., laptop) may limit how much information is communicated between the controller and the phases. While multiple measurements may be taken at the phases, complexity/size constraints may result in only one measurement being communicated to the controller. Existing monitoring approaches may communicate a maximum phase temperature so that the temperature of the hottest phase is monitored. In other words, a hottest phase may be a driver module of a group of driver modules having the highest temperature of the group of driver modules, while a coldest phase may be a driver module of a group of driver modules having the lowest temperature of the group of driver modules. This approach can accurately determine when a maximum operating temperature has been reached but still faces the problem of understanding which phase needs a lower load and which phase can accept a higher load.

The present disclosure describes systems and methods to balance thermal loads based on temperature information from each phase. The per phase temperature allows the controller to balance thermal performance across all active phases regardless of a phase count or a position of a phase on a board. The per phase temperature reporting is enabled by addressed communication between the controller and the phases.

The present disclosure further describes a method for assigning each phase a unique address to use for addressed communication with a controller over a shared communication bus. Hardwiring each phase to have a unique address can be problematic because it can severely limit the versatility of the phases and the topology of the power stage. Assigning each phase a unique address at startup is a better approach but still has problems. For example, often cost, complexity, and size limitations prevent the power stage from having the complexity (e.g., pin count) necessary to communicate directly between the controller and each phase. The disclosed approach solves these problems by assigning each phase a unique address without increasing the complexity of the power stage. In particular, the disclosed address assignment approach includes temporarily using a dedicated pulse width modulation (PWM) connection to assign a unique address to each phase. Then, after the assignment, the PWM connection may be returned to use for PWM signals for voltage regulation, while the phases can communicate over a common communication bus using their assigned unique address.

FIG. 1 illustrates a multiphase power stage according to an implementation of the present disclosure. The multiphase power stage 100 (i.e., voltage core, core supply, core, etc.) is configured to output one or more voltages at one or more rails. For the implementation shown, the multiphase power stage 100 includes a first voltage ($V_1$) at a first rail 151 and a second voltage ($V_2$) at a second rail 152. A load coupled to a rail can receive the voltage for power in a system. For example, a rail may supply a voltage to a processor in a laptop computer. The voltage at each rail is regulated so that it does not change significantly with changes in a condition of the load (i.e., load condition). However, the current at each rail can change to satisfy the load condition. For example, a load in a heavier load condition may draw more current than a load in a lighter load condition.

Each rail may be supplied with multiple phases to meet the current requirements of a load condition. What is more, the output of the phases may be adjusted so that the efficiency of the power stage is maximized as load conditions change. For example, one phase feeding the rail may supply all the power necessary in a light load condition, and to increase efficiency in this condition, all but this one phase may be disabled. Disabling phases in response to changing load conditions and/or thermal conditions may be referred to as phase shedding.

As shown in FIG. 1, the first rail 151 is supplied by a first set of phases 121A-D and the second rail 152 is supplied by a second set of phases 121E-H. Each phase of the multiphase power stage 100 may be implemented as a driver module (i.e., voltage-regulator (VR) module) configured to output a phase voltage and a phase current based on a pulse width modulation (PWM) signal received at a PWM pin of the driver module. Accordingly, the multiphase power stage 100 further includes a controller 110 (i.e., VR controller), that is configured to output a plurality of PWM signals at a plurality of PWM ports (i.e., PWM pins) to control the rail voltage/current according to a load condition. For example, to control the first rail 151, the controller 110 includes a first PWM port 130A to output a first PWM signal to a first PWM pin of a first driver module 121A, a second PWM port 130B to output a second PWM signal to a second PWM pin of a second driver module 121B, a third PWM port 130C to output a third PWM signal to a third PWM pin of a third driver module 121C, and a fourth PWM port 130D to output a fourth PWM signal to a fourth PWM pin of a fourth driver module 121D. The connections for the second rail 152 may be similarly described. For example, to control the second rail 152, the controller 110 includes a fifth PWM port 130E to output a fifth PWM signal to a fifth PWM pin of a fifth driver module 121E, a sixth PWM port 130F to output a sixth PWM signal to a sixth PWM pin of a sixth driver module 121F, a seventh PWM port 130G to output a seventh PWM signal to a seventh PWM pin of a seventh driver module 121G, and a eighth PWM port 130H to output a eighth PWM signal to a eighth PWM pin of a eighth driver module 121H.

The connections (e.g., wires, traces, etc.) between the PWM pins of the driver modules 121A-H and the PWM ports 130A-H of the controller may be referred to as PWM lines. For regulation, PWM signals can be transmitted to the driver modules 121A from the controller 110 over the PWM lines. These PWM signals for regulation may alternate between ON (i.e., HIGH) and OFF (i.e., LOW) according to a duty cycle that can be adjusted based on feedback from a load (not shown). To turn OFF a phase output, a PWM signal for the phase may be set at a level between the HIGH and LOW levels (i.e., MID level).

As shown in FIG. 1, the controller 110 and the driver modules 121A-H may also be coupled together (i.e., communicate over) a communication bus 140. The communication bus may include a data line and a clock line to support serial communication. In serial communication, a clock signal on the clock line alternates according to a clock frequency so that bits of data can be sequentially sent over the data line in time slots synchronized with the clock signal. Accordingly, this form of serial communication may be referred to as synchronous.

As shown in FIG. 1, the communication bus 140 is shared by all driver modules 121A-H. Accordingly, each driver module may be assigned an address for communication over the communication bus. The address enables a driver module to receive messages sent from the controller addressed to the driver module and ignore messages sent from the controller not addressed to the driver module. Further, the address enables the controller to identify return messages as sent from the driver module. The address may be configured so that the controller may transmit a message to one or more of the driver modules 121A-H based on the bits of the address. For example, based on the address, the controller 110 may send a global message to all phases 163 of the multiphase power stage 100; a rail message to all phases of one rail 162 of the multiphase power stage 100; and/or a phase message sent to a particular driver module 161 of the multiphase power stage 100.

Communication between the controller 110 and the driver modules 121A-H over the communication bus 140 may be advantageous for, at least, the reason that messages can be used to monitor thermal conditions at each driver module with a limited number of connections between the controller and each driver modules. This monitoring may be used to balance the thermal performance across all active phases.

The present disclosure is not limited to the implementation shown in FIG. 1 and may include any number of rails, each supplied by any number of phases. Further, it is possible that two driver modules can be coupled to a single PWM port of the controller 110 to receive the same PWM signal at respective PWM pins. For example, as shown in FIG. 1, a driver module 121I may be coupled, with the fifth driver module 121E, to the fifth PWM port 130E to receive the fifth PWM signal. In general, any two driver modules connected at their respective PWM pins to one PWM port of the controller may be referred to as parallel driver modules.

Figure 2:
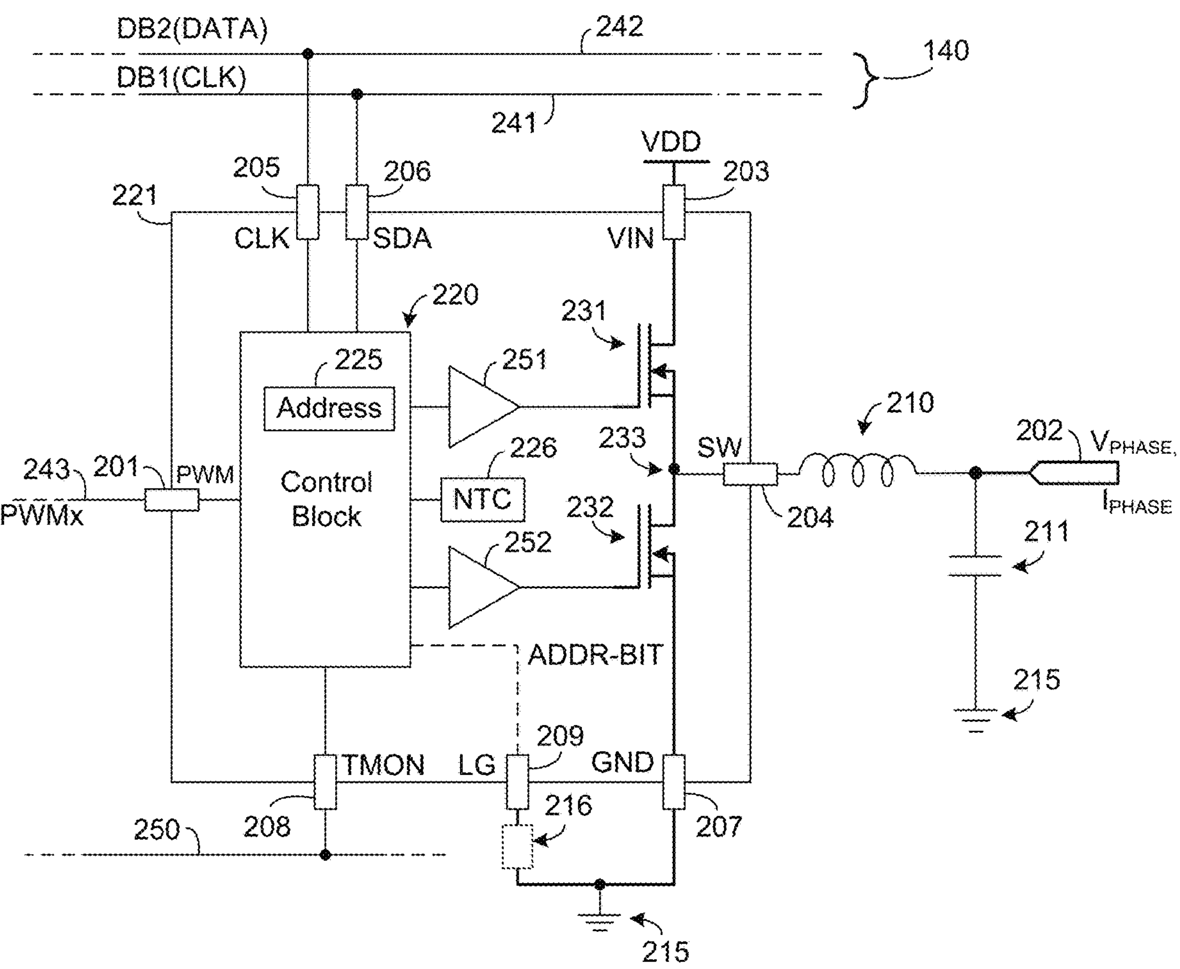
FIG. 2 is a block diagram schematically illustrating a driver module according to a possible implementation of the present disclosure.

FIG. 2 schematically illustrates a driver module according to an implementation of the present disclosure. As shown, the driver module includes drivers and transistors integrated within the same semiconductor package. The transistors can be metal oxide semiconductor field effect transistors (i.e., MOSFETs). As a result, this type of driver module can be referred to as a driver MOS (i.e., DrMOS). In the disclosure, the terms driver module, DrMOS, and voltage regulation module may be used interchangeably.

The driver module 221 may be configured to operate as a power converter configured to receive an input voltage ($V_{DD}$) at an input pin 203 ($V_{IN}$) and to output a phase voltage ($V_{PHASE}$) at a rail 202. For example, the driver module 221 may be configured as a synchronous buck converter having an output voltage ($V_{PHASE}$) that is less than its input voltage ($V_{DD}$). The synchronous buck converter operates by alternatively coupling (i.e., switching) a switch node 233 at a switch-node pin 204 (SW) to the input voltage ($V_{DD}$), received at the input pin 203 ($V_{IN}$), and a ground 215, received at a ground pin 207 (GND), according to a binary PWM signal received at a PWM pin 201 of the driver module 221. The PWM signal is transmitted from the controller (not shown) to the driver module 221 over a PWM line 243, which couples the PWM pin 201 to a respective PWM port of the controller (not shown). The alternating coupling of the switch node can sequentially charge and discharge an inductor 210 so that a voltage at a capacitor 211 is maintained at a regulated level. The duty cycle of the PWM signal can be adjusted to change the amounts of charging and discharging for each cycle of the PWM signal (i.e., each PWM cycle) in order to maintain the voltage at a relatively fixed level despite changes in a load coupled to the rail 202.

As shown in FIG. 2, the driver module 221 includes a control block 220 that includes the logic circuitry and the memory circuitry necessary to provide high-side switching signals to a high-side amplifier 251 that drives a gate of a high-side transistor 231 and to provide low-side switching signals to a low-side amplifier 252 that drives a gate of a low-side transistor 232 in order to perform the switching necessary for power conversion.

As shown in FIG. 2, the driver module 221 further includes a clock pin 205 (CLK) coupled to a clock line 241 of a communication bus 140. The clock line (i.e., DB1, CLK) is configured to carry a clock signal transmitted from a controller (not shown) for serial communication. The driver module 221 further includes a data pin 206 (SDA) coupled to a data line 242 of the communication bus 140. The data line (DB2, DATA) is configured to carry data (e.g., messages) transmitted from the controller (not shown) to the driver module 221 or to carry data transmitted from the driver module 221 to the controller. In other words, the communication bus 140 can provide a bi-directional communication interface between the driver module 221 and the controller (or other devices coupled to the communication bus 140). The communication bus 141 may be configured to carry synchronous, packet switched, serial communication supported by various communication protocols (e.g., $I^2C$, SMBus, etc.).

The control block 220 may be configured to code and decode messages transmitted/received from the communication bus 140 using an address stored at the driver module 221 (e.g., in an address register 225). At the time of fabrication, the address register 225 may be set (e.g., factory set) to a default address. For use, the default address may be replaced in the address register with a unique address. The controller may perform an address-assignment process (i.e., address assignment) to assign or change addresses stored in the address register 225 of each driver module 221 in a power stage. The controller may be triggered to perform the address assignment automatically (e.g., at startup) or manually (e.g., by a user). During the address assignment, regulation may be paused while the addresses are assigned.

In some implementations, the control block 220 may further include circuitry configured to measure a temperature of the phase and transmit this temperature to a temperature monitor pin 208 ($T_{MON}$). For example, the driver module 221 may include a temperature sensor 226. The temperature sensor may be implemented as a negative temperature coefficient (NTC) thermistor. In a possible implementation, the temperature sensor 226 is external to the driver module 221. The temperature sensor 226 can be coupled to the control block 220, which can generate a temperature signal based on the output of the temperature sensor 226 and transmit the temperature signal to the temperature monitor pin 208. The temperature monitor pin 208 may be coupled to a temperature bus 250. The temperature bus 250 can be used to communicate analog signals corresponding to temperatures. In other words, the communication bus 140 may be a bus for communicating digital signals while the temperature bus 250 may be a bus for communicating analog signals.

In some implementations a resistor 216 (i.e., strapping resistor) may be coupled between the low-side gate pin 209 (LG) and the ground 215. The resistor 216 (i.e., strapping resistor) can provide a pull-up voltage (i.e., strapping voltage) at the low-side gate pin 209 that can be decoded as an address bit by the control block 220. A look-up table (i.e., LUT) or threshold may be used to decode a voltage at the low-side gate pin 209 as one or more address bits for an address of the driver module 221. For example, a higher strapping voltage (e.g., voltage above a threshold) may be interpreted by the control block as a bit value of 1 and a lower voltage (e.g., voltage below the threshold) may be interpreted by the control block 220 as a bit value of 0. Accordingly, a message received having an address bit corresponding to the decoded address bit may be recognized.

Figure 3:
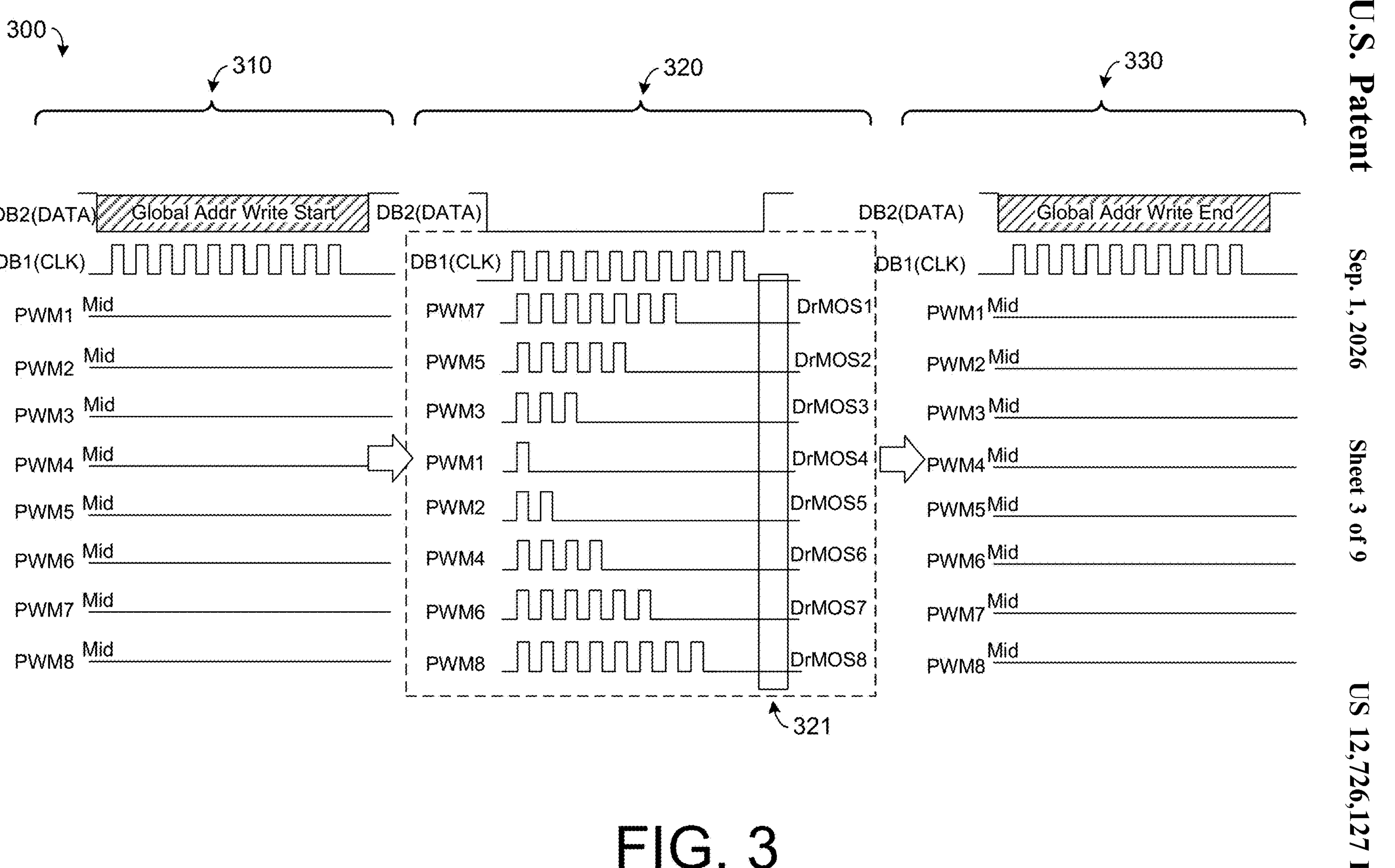
FIG. 3 illustrates signals in an address assignment process for driver modules of the power stage shown in FIG. 1 according to a possible implementation of the present disclosure.

FIG. 3 illustrates signals in an address assignment process 300 for driver modules of the power stage shown in FIG. 1 according to a possible implementation of the present disclosure. The signals include data signals (DATA) communicated over a data line 242 (DB2) of the communication bus 140 and a clock signal (CLK) communicated over a clock line 241 (DB1) of the communication bus 140. The signals further include PWM signals communicated over a first PWM line (PWM1), a second PWM line (PWM2), a third PWM line (PWM3), a fourth PWM line (PWM4), a fifth PWM line (PWM5), a sixth PWM line (PWM6), a seventh PWM line (PWM7), and an eight PWM line (PWM8).

The address assignment process 300 may include an initialization phase 310 (i.e., setup phase, enter phase). The initialization phase 310 includes transmitting a MID level PWM signal over the PWM lines (PWM1-5) to respective PWM pins of the driver modules of multiphase power stage 100. In each driver module 221, a MID level PWM signal received at the PWM pin 201 can turn OFF the high-side transistor 231 and the low-side transistor 232 to decouple the driver module 221 from the rail 202.

The initialization phase 310 further includes transmitting a setup message (WRITE START) from the controller to the plurality of driver modules (e.g., all driver modules) over the data line 242 (DB2) of the communication bus 140 in synchrony with a clock signal (CLK) transmitted over the clock line 241 (DB1). The setup message may include a global address so that it can be received by all driver modules of the multiphase power stage 100. The global address may include a default address that each driver module 221 is set to. For example, each driver module may be programmed at the time of fabrication (e.g., factory set) to communicate with a default address.

The setup message received by the plurality of driver modules may configure the plurality of driver modules to temporarily receive messages normally communicated over the communication bus 140 at respective PWM pins. For example, a setup message received by the driver module 221 of FIG. 2 can cause the driver module 221 to start receiving serial communication over the PWM line 243 (PWMx) and the clock line 241 (DB1) instead of the data line 242 (DB2) and the clock line 241 (DB1). In other words, the setup message may configure a driver module to stop receiving data (e.g., messages) at the data pin 206 (SDA) and start receiving data (e.g., messages) at the PWM pin 201 (PWM). The data received at the PWM pin 201 remains synchronous with the clock signal (CLK) received at the clock pin 205.

The assignment process shown in FIG. 3 further includes an assignment phase 320. The assignment phase 320 can include turning OFF the data line 242 (DB2) by sending a LOW signal. The assignment phase can further include transmitting a clock signal (CLK) over the clock line 241 (DB1) and transmitting address messages to one or more (e.g., all) of the driver modules. As shown, each address message may include multiple bits set to either a 1 (i.e., HIGH) or 0 (i.e., LOW). The reception of each bit is based on the clock signal so an address message may be received at a driver module one bit at a time until all bits of the address are received. The address messages to each driver module may be transmitted simultaneously according to the clock signal that is received over the shared communication bus. In other words, because the address messages are transmitted in parallel, all driver modules may receive respective address messages in the time (i.e., clock cycles) it takes for one driver module to receive its address message.

As shown, each address message may include an address for the driver module that is unique. The address for a driver module may include one or more bits to identify that it is a driver module of the power stage (i.e., global address bit(s)). The address for the driver module may further include one or more bits to identify that it is a driver module of a particular rail of the power stage (i.e., rail address bits(s)). The address for the driver module may further include bits to identify that it is a particular driver module (i.e., per phase bits(s)).

The assignment phase 320 may further include an acknowledgement period 321 during which the driver modules may collectively respond over the data line 242 (DB2) that they have received their address message. For example, a number of clock cycles after transmitting the address messages, the controller may monitor the data line 242 of the communication bus 140 for one or more clock cycles in an acknowledgement period 321. If, during the acknowledgement period 321, any of the driver modules pulls the data line 242 (DB2) LOW, then the controller may be configured to resend the address or take another action (e.g., generate an alert) because the LOW signal can indicate that one or more of the driver modules has not received the address message properly. Conversely if, during the acknowledgement period, the data line 242 remains HIGH, then the controller may be configured to conclude that all address messages have been received and the address assignment process 300 may enter an exit phase 330.

The exit phase 330 of the address assignment process 300. The exit phase 330 includes transmitting a MID level PWM signal over the PWM lines (PWM1-5) to respective PWM pins of the driver modules of multiphase power stage 100 to decouple the driver modules from their respective rail(s).

The initialization phase 310 further includes transmitting a stop message (WRITE END) from the controller to the plurality of driver modules (e.g., all driver modules) over the data line 242 (DB2) of the communication bus 140 in synchrony with a clock signal (CLK) transmitted over the clock line 241 (DB1). The stop message may include a global address so that it can be received by all driver modules of the multiphase power stage 100. The global address may include one or more address bits to indicate that it is for all driver modules.

Figure 4:
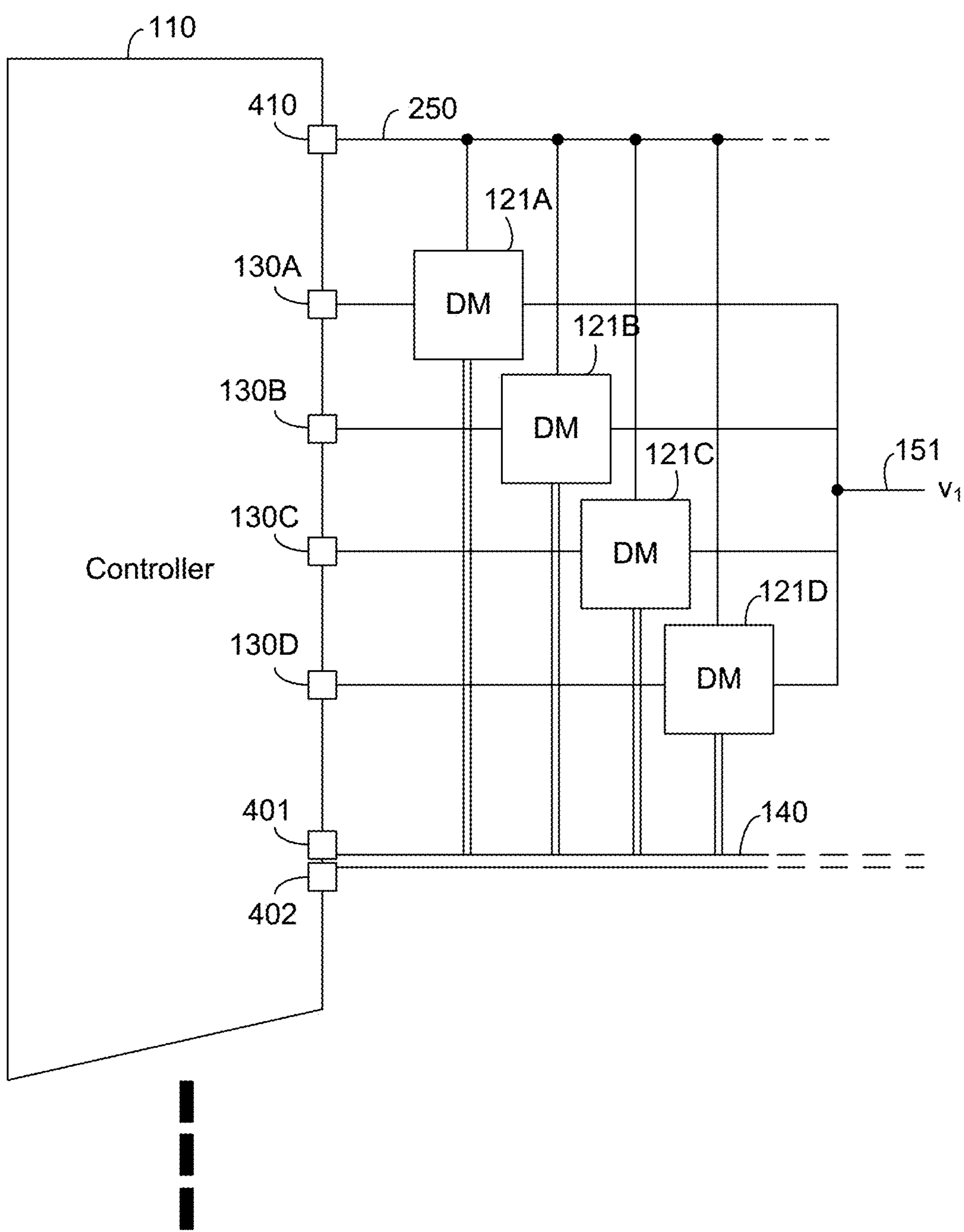
FIG. 4 is a block diagram of a portion of a multiphase power stage including a temperature bus according to a possible implementation of the present disclosure.

Temperature monitoring of the driver modules may be important for, at least, safety in a high-power multiphase power stage. FIG. 4 is a block diagram of a portion of a multiphase power stage according to a possible implementation of the present disclosure. As previously discussed, the multiphase power stage includes a controller 110 configured to drive a plurality of driver modules 121A-D to power a first rail 151. The controller may further include a data port 401 and a clock port 402 coupled to a communication bus 140. The controller may send serial communication messages to the driver modules via the communication bus 140.

While the controller 110 may transmit a temperature request message to a particular driver module over the communication bus 140 based on the address assigned to the particular driver module, the driver module may lack the complexity necessary to transmit a temperature measurement back to the controller 110 over the communication bus 140 with an identifying address. The present disclosure addresses this problem through a combined interface which can allow the controller to receive temperature measurements from each phase without adding complexity to the driver modules.

As shown in FIG. 4, the multiphase power stage can include a temperature bus 250. The temperature bus 250 may be a single line (e.g., trace, wire, etc.) coupled to a temperature port 410 of the controller 110 and coupled to a temperature monitor pin 208 of each driver module. This analog interface can only support communicating a limited amount of information. Traditionally, this analog interface only supported a single temperature or temperature fault signal from the plurality of driver modules 121A-D without knowledge of the particular temperatures of individual driver modules. For rudimentary safety, this may be sufficient, but in some applications more advanced temperature monitoring may be desirable. The present disclosure can enhance this monitoring by using a combined interface that includes features of the communication bus 140 and the temperature bus 250 so that particular temperatures of individual driver modules can be communicated.

The present disclosure describes circuits and methods to obtain temperatures from each driver module using the combined interface where addressed temperature requests are sent to driver modules over the communication bus 140 and temperature measurements are received from the driver modules over the temperature bus 250. In a possible implementation, the controller 110 may transmit a temperature request message to the first driver module 121A over communication bus 140 based on the address of the first driver module 121A. In response to this temperature request message from the controller 110, the first driver module 121A can transmit a temperature signal to the controller over the temperature bus 250 (e.g., at an agreed time). The temperature signal can be an analog signal (e.g., voltage) corresponding to a temperature sensor measurement obtained by the first driver module 121A.

The present disclosure further describes advanced control of the multiphase power stage based on thermal conditions (i.e., temperatures) communicated over the temperature bus. The controller may be configured to execute thermal balancing algorithms based on the reported thermal conditions that can help increase reliability and performance of the multiphase power stage. Further, this increase in reliability and performance does not require a significant increase in complexity of the driver modules or in the interface between the driver modules and the controller.

Figure 5:
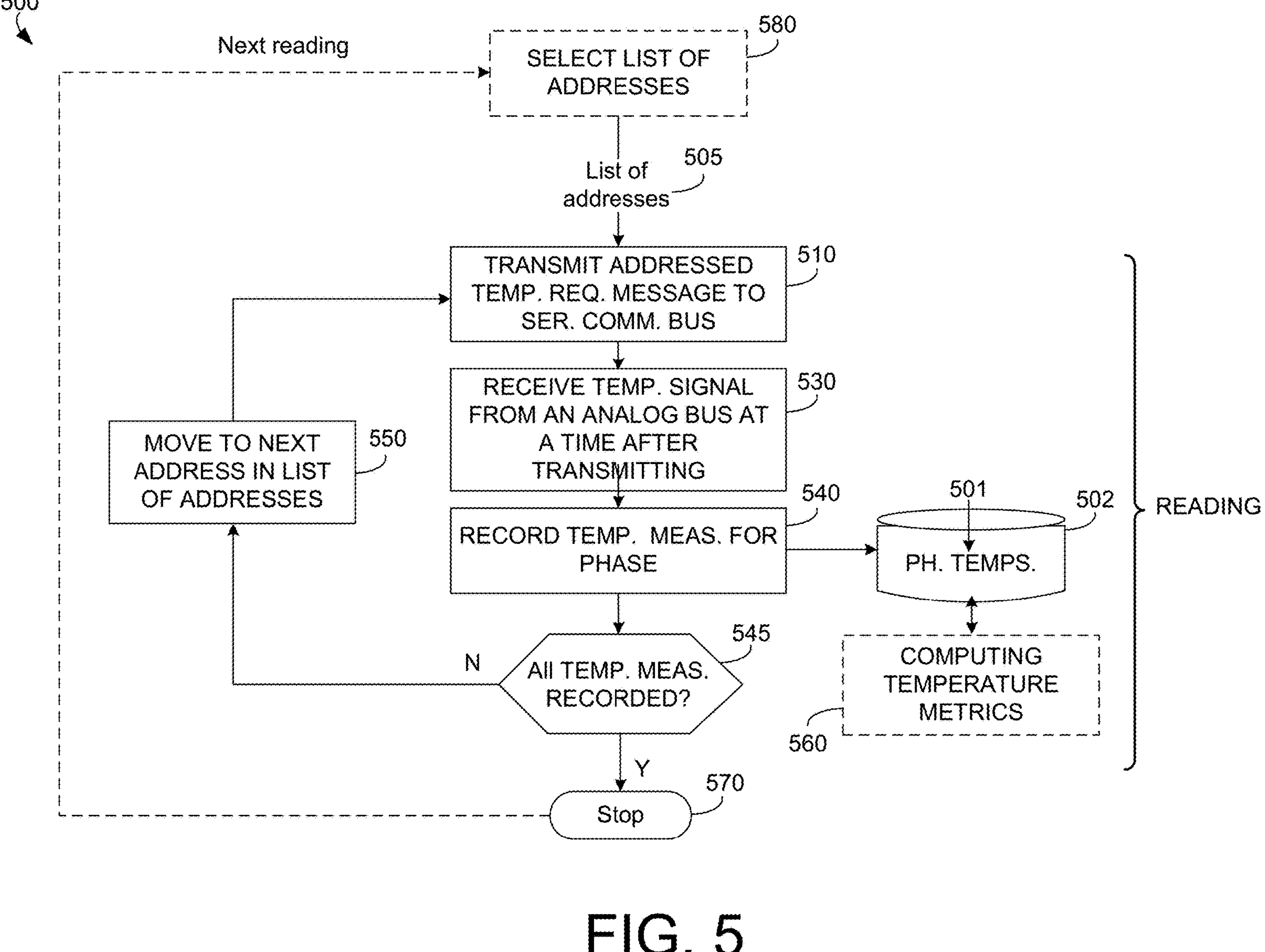
FIG. 5 is a flowchart of a method for obtaining temperatures of driver modules in a multiphase power stage according to a possible implementation of the present disclosure.

FIG. 5 is a flowchart of a method for obtaining temperatures of driver modules (i.e., phase temperatures 501) in a multiphase power stage according to a possible implementation of the present disclosure. The method 500 includes transmitting 510 an addressed temperature request message to a serial communication bus (e.g., communication bus 140). The address may be selected from a list of addresses 505 generated by the controller. The list of addresses 505 may include addresses of driver modules coupled to a common rail, all addresses of all driver modules of the multiphase power stage, or some other combination of driver modules. The list of addresses 505 may change over time. For example, the list of addresses 505 may include addresses of all driver modules that are active or addresses of all driver modules that are inactive at a given time. It is understood that many possible combinations and variations of addresses included in the list of addresses may exist and the present disclosure is not limited to any particular list of addresses.

The address obtained from the list of addresses 505 can be all or part of an address assigned to the driver modules during an address assignment process 300, such as shown in FIG. 3. The address may be used in a temperature request message that further includes instructions for the driver module receiving the message to transmit an analog signal (e.g., analog voltage) corresponding to a temperature of the driver module to the temperature bus 250. Accordingly, the driver module (e.g., see FIG. 2) may include at least one temperature sensor 226 (e.g., thermistor, negative temperature coefficient (NTC) sensor etc.) configured to measure a temperature of the driver module 221 and generate a temperature measurement. A control block 220 of the driver module 221 may be configured to process (e.g., scale, filter, etc.) the temperature measurement to generate a temperature signal corresponding to the temperature of the driver module. The driver module 221 may be further configured to transmit the temperature signal to the temperature bus 250.

The method 500 further includes receiving 530 the temperature signal from the analog temperature bus 250 at a time after transmitting the temperature request message. The time may be measured in clock cycles. For example, the controller 110 may count a number of clock cycles (e.g., 1 clock cycle) before receiving the signal at the temperature port 410. For simplicity, the driver module may not include a counter, in which case, the driver module may transmit the temperature signal for a period immediately after receiving the temperature request message. The controller 110 may be configured to sample this temperature signal at any time during the period.

The method 500 further includes recording 540 a phase temperature for the driver module (i.e., phase) based on the received temperature signal. The recording may include translating the temperature signal to a temperature. For example, the controller may be further configured to convert the temperature signal, which can be an analog voltage, into a temperature measurement, which can be in degrees Celsius (e.g., based on a lookup table stored at the controller). The recording may further include storing the temperature in a database 502 with a label to identify the temperature as the phase temperature of a particular driver module. In a possible implementation, the label may be the address of the phase. Accordingly, the controller 110 can be configured to determine the address based on the time that the temperature signal is received. For example, a temperature of the first driver module 121A may be recorded based on the temperature signal received immediately after (e.g., at a first clock cycle after) a temperature request to the first driver module 121A is transmitted.

The temperature of the phase may be stored in a database 502 of phase temperatures. In a possible implementation the database 502 is simply a table of the phases in the multiphase power stage with the most recent phase temperatures. Newer phase temperatures may replace older phase temperatures in the table as they are acquired. In another possible implementation, the database 502 can further store phase temperatures according to time so that the temperature history of a phase may be determined. The database may be located in a computer readable memory of the controller 110 or in a computer readable memory otherwise accessible to the controller 110.

The method 500 further includes determining 545 if all temperature measurements have been recorded for all addresses in the list of addresses 505. If not (i.e., N), the controller can move 550 to the next address in list of addresses 505 and repeat the method 500. This process can continue until all temperature measurements for all driver modules (i.e., addresses) in the list of addresses are recorded in the database 502, at which point the method 500 may stop 570.

The method 500 may be restarted at a later time using the same list of addresses or using a new (i.e., different) list of addresses. In other words, the process of obtaining all phase temperatures for a list of addresses may be referred to as a temperature reading event (i.e., temperature reading). After a first reading at a first time, the method may or may not pause for a period before beginning a next reading at a second time, and in a possible implementation, the method 500 can include selecting 580 a list of addresses at the start of the next reading. This newly selected list of addresses may be the same as the list of addresses used in the previous reading (e.g., all phases). Alternatively, the list of addresses at a first reading and a second reading may be different. For example, a first reading may include obtaining phase temperatures of driver modules from a first list of addresses that includes driver modules for a first rail, and a second reading may include obtaining phase temperatures of driver modules from a second list of addresses that includes driver modules for a second rail.

A list of addresses for a reading may include a single address for a driver module (i.e., phase) of the multiphase power stage, addresses of all driver modules of the multiphase power stage, or any combination of addresses. List of addresses for readings may be created as needed (e.g., based on current active phases) or can be part of a routine schedule. The lists of addresses may be stored in a memory accessible to the controller 110. The period between readings may be the same or different. In a possible implementation, the period can be proportional to a thermal coefficient corresponding to one or more of the driver modules of the multiphase power stage.

The phase temperatures stored in the database 502 can be used for a variety of applications (e.g., algorithms). Some applications may require more than raw phase temperature data. Accordingly, in a possible implementation, the method further includes computing 560 temperature metrics based on the measured temperatures. Computing metrics can include combining phase temperatures. For example, multiple phase temperatures can be combined (e.g., averaged) to form a combined temperature (e.g., average rail temperature). Computing metrics can include comparing phase temperatures. For example, a comparison can be used to select one temperature (i.e., maximum temperature) or to filter temperatures (e.g., temperatures above a value). Computing metrics can include determining a change of phase temperatures over time. For example, it may be determined that a phase temperature is increasing. Further in may be determined that the phase temperature is increasing at a rate. The temperature metrics may also be stored in the database 502 and can be used to trigger functions/actions in the operation of the controller and/or driver modules.

Figure 6:
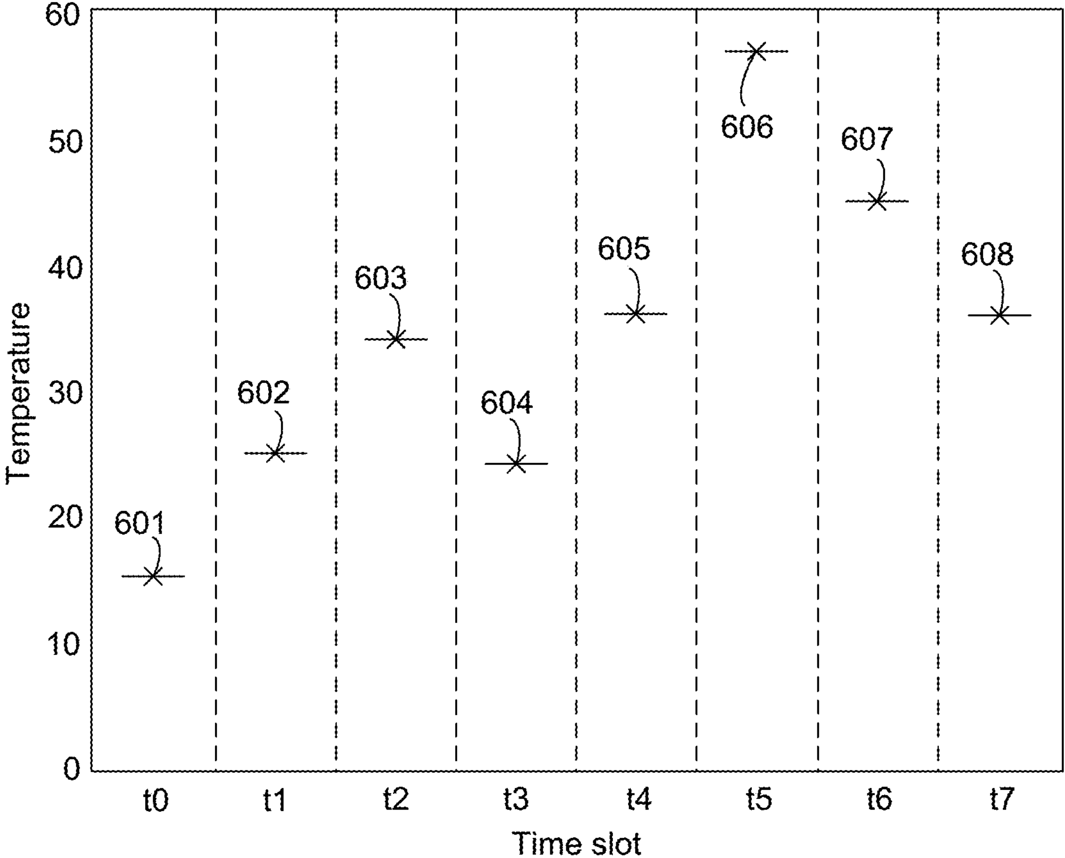
FIG. 6 is a graph of temperature signals transmitted to a temperature bus in time slots according to a possible implementation of the present disclosure.

FIG. 6 is a graph of temperature signals transmitted to a temperature bus 250 according to time slots. The time slots may correspond to repetitions (i.e., cycles) of the method 500 shown in FIG. 5. The number of time slots may correspond with the number of phases in the list of addresses 505. As shown, the eight times ($t_0$, $t_1$, $t_2$, $t_3$, $t_4$, $t_5$, $t_6$, $t_7$) can correspond to all driver modules 121A-H of the multiphase power stage 100 shown in FIG. 1. For example, a first temperature measurement 601 may be received at the temperature port 410 of the controller 110 at a first time ($t_0$); a second temperature measurement 602 may be received at the temperature port 410 of the controller 110 at a second time ($t_1$); a third temperature measurement 603 may be received at the temperature port 410 of the controller 110 at a third time ($t_2$); a fourth temperature measurement 604 may be received at the temperature port 410 of the controller 110 at a fourth time ($t_3$), a fifth temperature measurement 605 may be received at the temperature port 410 of the controller 110 at a fifth time ($t_4$), a sixth temperature measurement 606 may be received at the temperature port 410 of the controller 110 at a sixth time ($t_5$), a seventh temperature measurement 607 may be received at the temperature port 410 of the controller 110 at a seventh time ($t_6$); and an eight temperature measurement 608 may be received at the temperature port 410 of the controller 110 at a first time ($t_7$). The controller may be configured to determine which temperature measurement corresponds to which driver module by the time at which it was received. The determination of per phase temperature can allow for thermal algorithms, such as thermal balancing.

Figure 7:
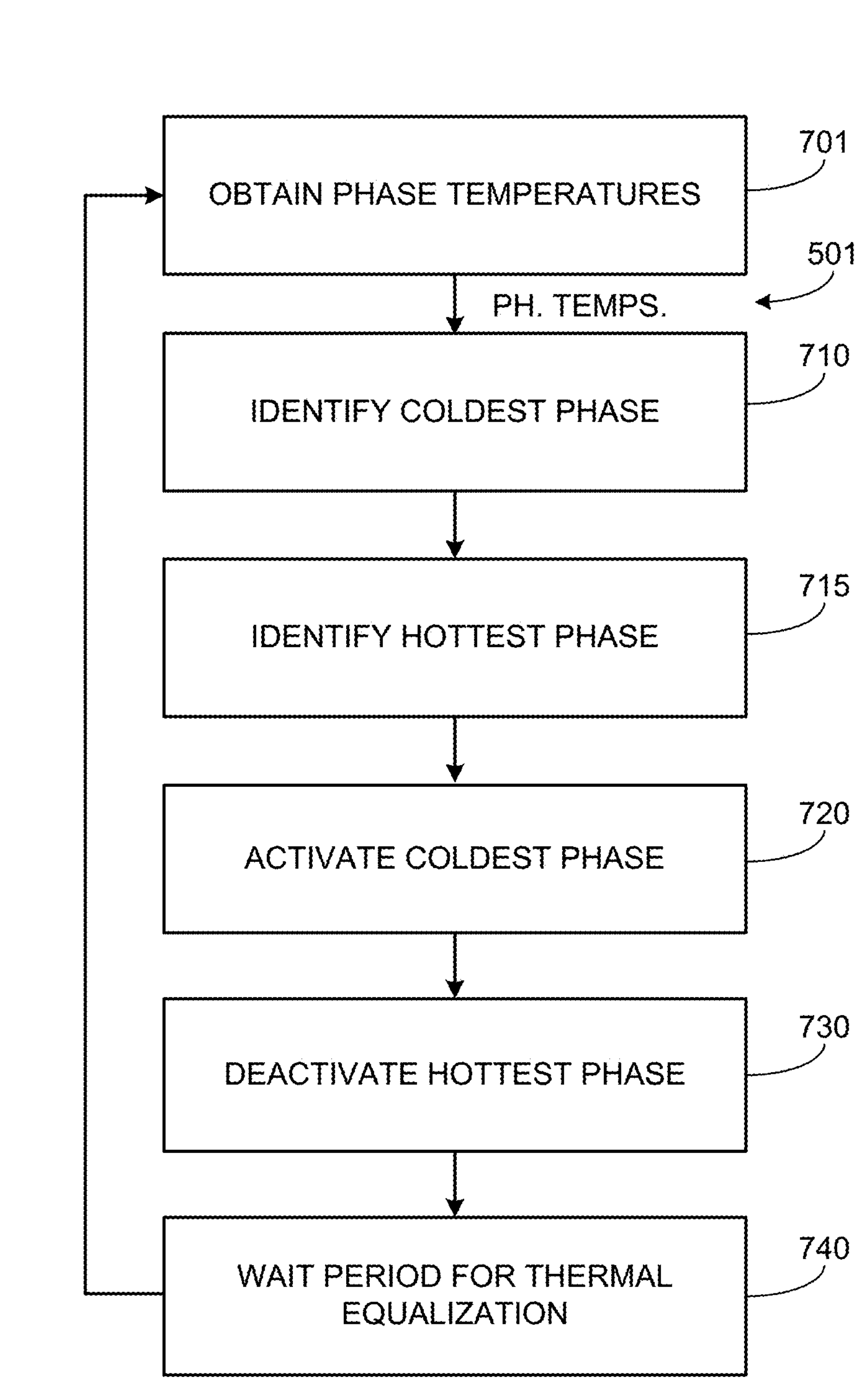
FIG. 7 is a flowchart of a method for thermal balancing in a multiphase power stage according to a possible implementation of the present disclosure.

FIG. 7 is a flowchart of a method for thermal balancing in a multiphase power stage according to a possible implementation of the present disclosure. The method 700 includes obtaining 701 phase temperatures. For example, the phase temperatures may be obtained by triggering a new reading (e.g., see FIG. 5). Alternatively, the phase temperatures 501 may be obtained by querying the database 502 for phase temperatures from a previous reading. The phase temperatures 501 include a plurality of temperatures from phases of a rail, phases of a group of rails, all phases of a multiphase power stage, active phases, inactive phases, or the like.

The method 700 further includes identifying 710 the coldest phase (i.e., coldest driver module) from the plurality of phase temperatures. Identifying 710 the coldest phase can include determining the lowest phase temperature of the plurality of phase temperatures and then determining the phase (e.g., driver module) corresponding to the lowest temperature by its label (e.g., address). The method 700 further includes identifying 715 the hottest phase (i.e., hottest driver module) from the plurality of phase temperatures. Identifying 715 the hottest phase can include determining the highest phase temperature of the plurality of phase temperatures and then determining the phase (e.g., driver module) corresponding to the highest temperature by its label (e.g., address).

The method 700 further includes activating 720 the phase (i.e., driver module) having the coldest phase temperature. Activating the coldest phase may include transmitting a message to the address of the coldest driver module using the communication bus 140. An active phase may be a phase in the ON state. Accordingly, the message to activate a driver module may be an ON command message (i.e., ON command). An ON command received by a driver module may configure the driver module in an ON state from another state (e.g., OFF state, SLEEP state, non-switching state, etc.).

In an OFF state, circuits to drive the high-side transistor 231 and the low-side transistor 232 are deactivated and not powered. These circuits can include the PWM control logic, a level shifter, high-side amplifier 251, and low-side amplifier 252. Additionally, circuitry for current monitoring and thermal fault detection may be deactivated. In the OFF state, the driver module is not switching in any mode (DCM, CCM) of operation. The signal at the PWM of a driver module that is OFF may be LOW or MID level with no toggling. The driver module in the OFF state does not report any parameters to the controller. The controller may transmit an OFF command to place any or all of the driver modules of the multiphase power stage in an OFF state based on the address of the OFF command. Waking from an OFF state may take extra time as the circuits are brought online. For example, the current monitoring circuit may be recalibrated as the ON state is entered. The controller may transmit a ON command to move any or all of the driver modules of the multiphase power stage from the OFF state to the ON state based on the address, or addresses, of the ON command.

In a SLEEP state, circuits to drive the high-side transistor 231 and the low-side transistor 232 (i.e., switching circuitry) are deactivated (i.e., inactive, not toggling) but powered so that waking from the SLEEP state is faster than waking from an OFF state. In the SLEEP state, the PWM input is held at a MID level so that the sleeping driver module does not affect the rail voltage. The controller may transmit a SLEEP command (i.e., STANDBY command) to place any, or all, of the driver modules of the multiphase power stage in the SLEEP state based on the address of the SLEEP command.

In the ON state all circuits (e.g., high-side transistor and low-side transistor (switching circuitry)) in the driver module are active and operating to provide a regulated voltage to a rail as described previously. For example, in the ON state, a driver module will be switching either in discontinuous conduction mode (i.e., DCM), when the PWM input toggles between a MID level and a HIGH level or in continuous conduction mode (i.e., CCM) when the PWM toggles between a LOW level and a HIGH level. The driver module can also report thermal status and current information back to the controller for regulation and reporting purposes in the ON state.

The method 700 further includes deactivating 730 the phase having the hottest phase temperature. Deactivating the hottest phase may include transmitting a message to an address of the hottest phase using the communication bus 140. The message may be a SLEEP command to configure the hottest driver module from the ON state to the SLEEP state. Alternatively, the message may be an OFF command to configure the hottest driver module from the ON state to an OFF state. Alternatively, the message may be a message to turn OFF the high-side transistor 231 and the low-side transistor 232 (e.g., using a MID level PWM signal) so that the hottest driver module is placed in a non-switching state.

The method 700 further includes waiting 740 a period after the coldest phase is activated and the hottest phase is deactivated. The period may allow the phases to reach a thermal equalization before repeating the method 700. The period may be based on a thermal coefficient corresponding to at least one of the driver modules of the multiphase power stage 100. In a possible implementation, the period is proportional to an average thermal coefficient of the driver modules so one phase does not become too hot or too cold. For example, repeating the period too slowly (i.e., long period) may allow the phase temperature of a particular phase (i.e., driver module) to become too high (e.g., above a fault threshold).

Figure 8:
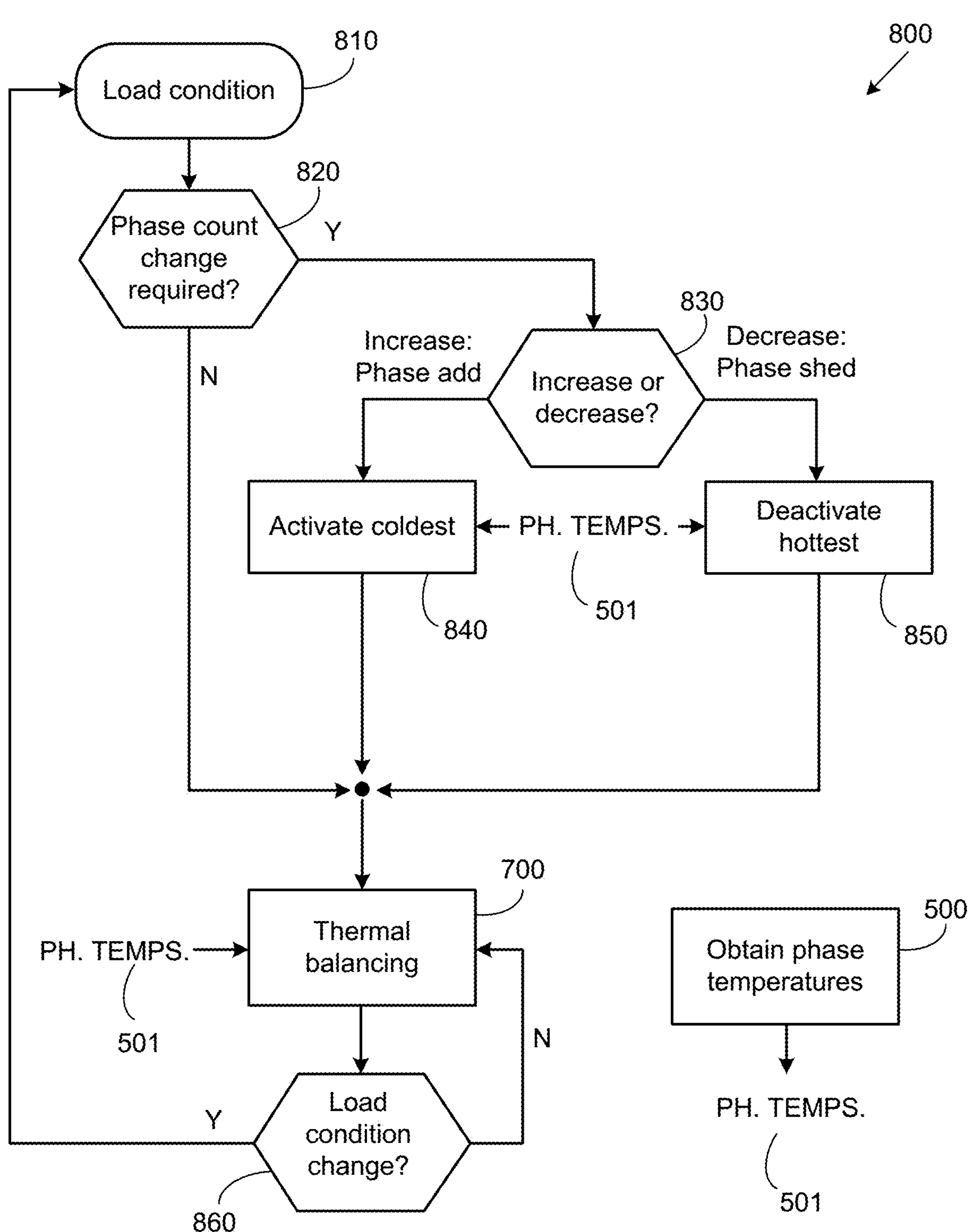
FIG. 8 is a flowchart of a method for thermal management in a multiphase power stage according to a possible implementation of the present disclosure.

FIG. 8 is a flowchart of a method for phase shedding based on thermal conditions in a multiphase power stage according to a possible implementation of the present disclosure. The method 800 includes receiving a load condition 810.

A load condition may be based on a current level required by a rail. A load condition is heavy when a current drawn from the rail is relatively high and the load condition is light when the current drawn from the rail is relatively low. In a heavy load condition, all phases for the rail may be active and operating to deliver current to the rail. In a light load condition, some phases for the rail may be deactivated (e.g., in a SLEEP state). A number of active phases for a rail may be referred to as a phase count.

A phase count may change with load condition. Accordingly, the method 800 includes determining 820 if a phase count change is necessary based on a load condition 810. For example, if a load condition becomes lighter (e.g., the current drawn by the load decreases), then the phase count may be decreased (i.e., phase shed). Alternatively, if a load condition becomes heavier (e.g., current drawn by load increases), then the phase count may be increased (i.e., phase add).

After determining 820 that a phase count change is required, the method 800 includes determining 830 if the phase count should be decreased or increased. If the phase count should be decreased (e.g., reduced by one), then the method 800 includes deactivating 850 the hottest phases based on the temperatures of the phases (i.e., based on phase temperatures 501). If the phase count should be increased (e.g., increased by one), then the method 800 includes activating 840 the coolest phases based on the temperatures of the phases (i.e., based on phase temperatures 501).

After the phase count change for the load condition 810 has occurred (or if no phase count change is required), then the method 800 performs thermal balancing, as shown in the method 700 FIG. 7. In other words, while the phase count for a load condition remains stable, phases can be activated and deactivated (i.e., shuffled) based on their phase temperatures 501 (see FIG. 7) in order to distribute the heating between the phases. The thermal balancing may continue until a change in the load condition is detected 860. If a change in load condition is detected 860, then a new load condition 810 may be obtained and the method 800 may be repeated with the new load condition.

Figure 9:
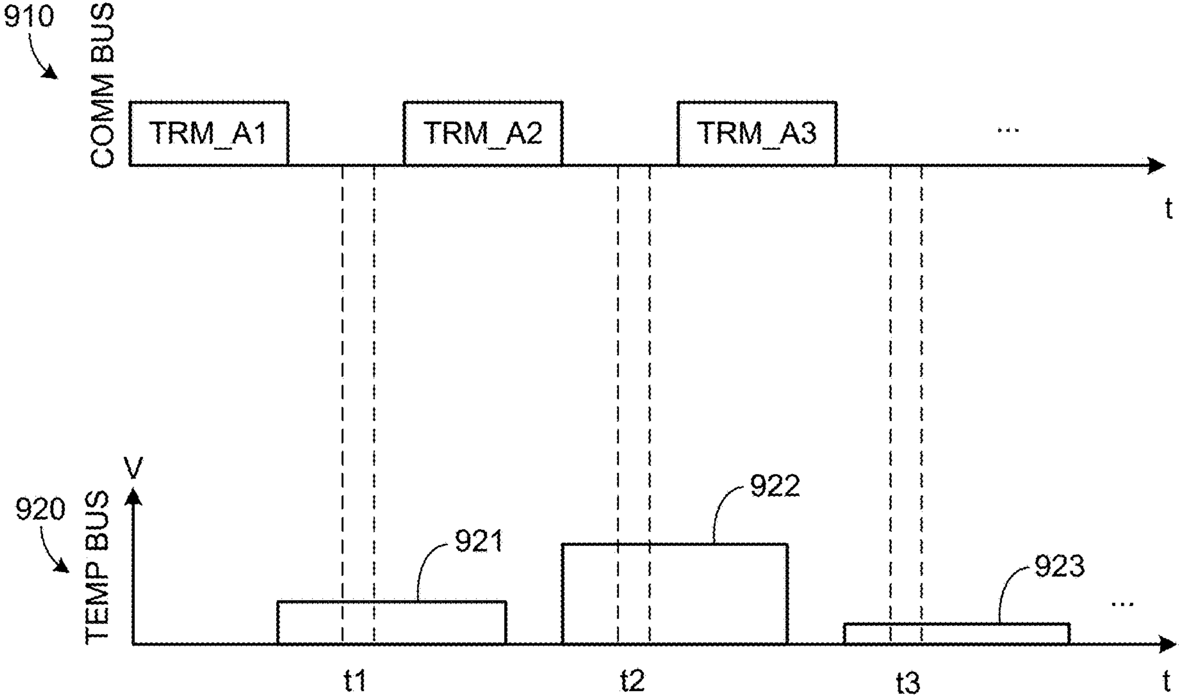
FIG. 9 illustrates signals of a combined interface for communicating temperatures in a multiphase power stage according to a possible implementation of the present disclosure.

FIG. 9 illustrates signals of a combined interface for communicating temperatures in a multiphase power stage according to a possible implementation of the present disclosure. As shown, the combined interface includes addressed digital messages transmitted from a controller to drivers over a communication bus 910 and an analog temperature signal transmitted from drivers to the controller over a temperature bus 920.

In particular, a first temperature request message (TRM_A1) addressed to a first driver module is transmitted over the communication bus 910. In response, the first driver module transmits a first temperature signal 921 (i.e., voltage) onto the temperature bus 920 for a first period. The controller can then receive this first temperature signal 921 at a first timeslot ($t_1$) during the first period to determine a temperature of the first driver module.

A second temperature request message (TRM_A2) addressed to a second driver module is then transmitted over the communication bus 910. In response, the second driver transmits a second temperature signal 922 onto the temperature bus 920 for a second period. The controller can then receive this second temperature signal at a second timeslot ($t_2$) during the second period to determine a temperature of the second driver module.

A third temperature request message (TRM_A3) addressed to a third driver module is then transmitted over the communication bus 910. In response, the third driver transmits a third temperature signal 923 onto the temperature bus 920 for a third period. The controller can then receive this third temperature signal at a third timeslot ($t_3$) during the third period to determine a temperature of the third driver module.

An advantage of the present approach is that the driver modules do not need any timing circuitry or analog to digital conversion circuitry in order to communicate the temperature signals to the controller in a way that the controller can understand where the temperature signal is originating. For example, the period of the transmission may be controlled through analog circuitry and can vary without affecting the signal received during the time slot.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for balancing temperatures in a multiphase power stage, the method comprising:

performing a temperature reading by:

transmitting temperature request messages to driver modules over a digital communication bus; and receiving temperature measurements from the driver modules over an analog temperature bus after transmitting the temperature request messages;

determining a hot phase address and a cold phase address of the driver modules based on the temperature measurements;

transmitting a deactivate message over the digital communication bus to deactivate a first driver module at the hot phase address; and transmitting an activate message over the digital communication bus to activate a second driver module at the cold phase address.

2. The method according to claim 1, further comprising:

performing the temperature reading at intervals; and selecting a list of phase addresses before performing the temperature reading for each interval.

3. The method according to claim 2, wherein:

the list of phase addresses at a first interval includes the driver modules common to a first rail; and the list of phase addresses at a second interval includes the driver modules common to a second rail.

4. The method according to claim 3, wherein the list of phase addresses at the first interval does not include the driver modules that are common to the first rail that are inactive.

5. The method according to claim 2, further comprising:

waiting a period after the first driver module is deactivated and the second driver module is activated before performing a subsequent temperature reading.

6. The method according to claim 5, wherein the period corresponds to an average thermal coefficient of the first driver module and the second driver module.

7. The method according to claim 1, wherein receiving the temperature measurements from the driver modules over the analog temperature bus after transmitting the temperature request messages includes:

the driver modules transmitting to the analog temperature bus at different times, each driver module configured to count clock cycles on the digital communication bus to determine when to transmit to the analog temperature bus.

8. The method according to claim 7, further comprising:

each driver module transmits to the analog temperature bus for a period after receiving a respective temperature request message.

9. The method according to claim 1, further comprising:

recording the temperature measurements corresponding to the driver modules to a database; and replacing older temperature measurements in the database with the temperature measurements.

10. The method according to claim 1, further comprising:

recording the temperature measurements corresponding to the driver modules to a database; and appending the temperature measurements to older temperature measurements.

11. The method according to claim 10, further comprising:

determining a temperature increase or a temperature decrease based on the temperature measurements.

12. The method according to claim 1, further comprising:

averaging the temperature measurements to determine an average rail temperature.

13. A multiphase power stage comprising:

a plurality of driver modules; and a controller coupled to the plurality of driver modules, the controller configured to:

transmit temperature request messages to driver modules over a digital communication bus;

receive temperature measurements from the driver modules over an analog temperature bus after transmitting the temperature request messages;

determine a hot phase address and a cold phase address of the driver modules based on the temperature measurements;

transmit a deactivate message over the digital communication bus to deactivate a first driver module at the hot phase address; and transmit an activate message over the digital communication bus to activate a second driver module at the cold phase address.

14. The multiphase power stage according to claim 13, wherein:

the driver modules are configured to transmitting to the analog temperature bus at different times based on each respective temperature request message; and each driver module includes a counter configured to count clock cycles on the digital communication bus to determine when to transmit to the analog temperature bus.

15. The multiphase power stage according to claim 13, wherein the controller is configured to:

receive analog signals corresponding to the temperature measurements at a temperature port; and transmit digital signals corresponding to the temperature request messages at a data port and a clock port.

16. The multiphase power stage according to claim 13, wherein each driver module of the plurality of driver modules is configured to:

receive a digital signal corresponding to a respective temperature request messages at a data pin and a clock pin; and transmit an analog signal corresponding to a respective temperature measurement at a temperature monitoring pin.

17. The multiphase power stage according to claim 13, wherein the first driver module at the hot phase address is configured, in response to the deactivate message, to:

enter a SLEEP state that includes deactivated switching circuitry but is otherwise powered.

18. The multiphase power stage according to claim 13, wherein the second driver module at the cold phase address is configured, in response to the activate message to:

enter an ON state that includes activating all switching circuitry to switch according to a received pulse width modulation signal.

19. A driver module for a multiphase power stage, the driver module comprising:

switching circuitry configured to alternatively couple an input voltage and a ground voltage to a switch node;

a temperature sensor configured to generate a temperature measurement; and a control block configured to:

receive a temperature request message from a controller and addressed to the driver module over a digital communication bus;

transmit the temperature measurement to the controller over an analog temperature bus at a scheduled time;

receive a deactivate message from the controller and addressed to the driver module over the digital communication bus; and deactivate the switching circuitry based on the deactivate message.

20. The driver module for the multiphase power stage according to claim 19, wherein the temperature request message is a first temperature request message, the temperature measurement is a first temperature measurement, and the control block is further configured to:

receive a second temperature request message from the controller and addressed to the driver module over the digital communication bus, the second temperature request message received a period after receiving the deactivate message;

transmit a second temperature measurement to the controller over the analog temperature bus;

receive an activate message from the controller and addressed to the driver module over the digital communication bus; and active the switching circuitry based on the activate message.

* * * * *